(12) United States Patent
Sallas et al.

(10) Patent No.: US 9,829,588 B2
(45) Date of Patent: Nov. 28, 2017

(54) METHOD AND SYSTEM FOR AUGMENTING LOW-FREQUENCY RANGE OF SEISMIC SURVEY

(71) Applicant: CGG SERVICES SA, Massy (FR)

(72) Inventors: John Sallas, Plano, TX (US); Thomas Bianchi, Paris (FR)

(73) Assignee: CGG SERVICES SAS, Massy (FR)

( * ) Notice: Subject to any disclaimer, the term of this patent is extended or adjusted under 35 U.S.C. 154(b) by 49 days.

(21) Appl. No.: 14/902,026

(22) PCT Filed: Jul. 9, 2014

(86) PCT No.: PCT/EP2014/064736
§ 371 (c)(1),
(2) Date: Dec. 30, 2015

(87) PCT Pub. No.: WO2015/004197
PCT Pub. Date: Jan. 15, 2015

(65) Prior Publication Data
US 2016/0313461 A1 Oct. 27, 2016

Related U.S. Application Data

(60) Provisional application No. 61/844,580, filed on Jul. 10, 2013.

(51) Int. Cl.
*G01V 1/00* (2006.01)
*G01V 1/155* (2006.01)
*G01V 1/143* (2006.01)

(52) U.S. Cl.
CPC .............. *G01V 1/155* (2013.01); *G01V 1/003* (2013.01); *G01V 1/143* (2013.01)

(58) Field of Classification Search
CPC ......... G01V 1/143; G01V 1/155; G01V 1/003
(Continued)

(56) References Cited

U.S. PATENT DOCUMENTS 3,216,525 A 11/1965 Fail et al.
4,014,403 A 3/1977 Mifsud
(Continued)

FOREIGN PATENT DOCUMENTS

EP 1 886 746 A1 2/2008
GB 921692 3/1963
GB 946589 1/1964

OTHER PUBLICATIONS

"Chuck (engineering)," Wikipedia, Jun. 14, 2012, downloaded Apr. 12, 2017 from https://en.wikipedia.org/w/index.php/?title=Chuck_(engineering)&oldid=497479579, 10 pages.*
(Continued)

*Primary Examiner* — Daniel L Murphy
(74) *Attorney, Agent, or Firm* — Patent Portfolio Builders PLLC

(57) ABSTRACT

Method and resonant source for generating low-frequency seismic waves. The resonant source includes a frame; a reaction mass configured to oscillate relative to the frame; a resonant suspension system connecting the reaction mass to the frame and including at least a spring; and a spring clamp system connected to the resonant suspension system and configured to modify a resonant frequency of the resonant suspension system. The resonant suspension system is configured to allow the reaction mass to oscillate relative to the frame with a corresponding resonant frequency.

20 Claims, 16 Drawing Sheets

(58) Field of Classification Search
USPC .................................................. 367/37, 189
See application file for complete search history.

(56) References Cited

U.S. PATENT DOCUMENTS

| | | |
|---|---|---|
| 7,188,993 B1 | 3/2007 | Howe et al. |
| 2010/0199772 A1 | 8/2010 | Bagaini |
| 2011/0085422 A1 | 4/2011 | Thompson et al. |

OTHER PUBLICATIONS

International Search Report and Written Opinion issued in related international application No. PCT/EP2014/064736, dated Jan. 30, 2015.

* cited by examiner

METHOD AND SYSTEM FOR AUGMENTING LOW-FREQUENCY RANGE OF SEISMIC SURVEY

BACKGROUND

Technical Field

Embodiments of the subject matter disclosed herein generally relate to methods and systems and, more particularly, to mechanisms and techniques for increasing a low-frequency content of seismic waves generated during a seismic survey.

Discussion of the Background

Reflection seismology is a method of geophysical exploration to determine the properties of a portion of the earth's subsurface, information that is especially helpful in the oil and gas industry. Reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

A land configuration for performing a seismic survey is illustrated in FIG. 1, which shows a system 100 that includes plural receivers 102 positioned over an area 104 of a subsurface to be explored and in contact with, or below the surface 106 of the ground. A number of seismic sources 108 (e.g., vibrators) are also placed on the surface 106 in an area 110, in a vicinity of the area 104 of the receivers 102. Alternatively, sources 108 may be buried under surface 106. A recording device 112 is connected to the plurality of receivers 102 and placed, for example, in a towed trailer, recording truck or other vehicle 114. Each source 108 can be composed of a variable number of vibrators, typically between one and five, and can include a local controller 116. A central controller 118 can be provided to coordinate the shooting times of sources 108. A global positioning system (GPS) 120 can be used to time-correlate the firing of sources 108 and/or seismic data recorded by receivers 102.

With this configuration, sources 108 are controlled to generate seismic waves, and the plurality of receivers 102 records waves reflected by the oil and/or gas reservoirs and other structures.

However, existing vibratory source elements are not effective in the low-frequency range of the spectrum, mainly 1 to 10 Hz, and more particularly, in the low frequency range of 0.5 to 5 Hz. In other words, energy generated by present sources in the very low-frequency spectrum and the resulting reflected energy is too weak to provide the necessary signal-to-noise ratio required for its successful application in seismic imaging. The low-frequency energy range is useful in seismic exploration because it provides better depth penetration of the seismic signal, which is extremely valuable for imaging in complex geological settings, such as sub-salt, basalt or even dense carbonate. The success of advanced techniques such as seismic inversion, which is useful for data interpretation, requires energy in the low-frequency range.

Thus, there is increasing interest in extending the seismic survey's bandwidth to lower frequencies to facilitate later imaging processing steps like seismic inversion. In the recent past, low-dwell sweeps have been developed to boost the low-frequency output of seismic vibrators with some success; however, because of stroke limitations, the peak low-frequency amplitude levels are quite weak and the dwell times need to become very long. The challenge of delivering sufficient low-frequency energy and still producing enough energy at moderate and high frequency for imaging can prove quite difficult when the cost of a survey is also considered.

Thus, there is a need to obtain low-frequency range seismic data for seismic interpretation without affecting the moderate and high-frequency energy. To be able to record such data, the source needs to be adjusted/modified to generate such low-frequency content. Therefore, it is desirable to provide sources and methods capable of generating low-frequency energy.

SUMMARY

According to one embodiment, there is a resonant source for generating low-frequency seismic waves. The resonant source includes a frame; a reaction mass configured to oscillate relative to the frame; a resonant suspension system connecting the reaction mass to the frame and including at least a spring; and a spring clamp system connected to the resonant suspension system and configured to modify a resonant frequency of the resonant suspension system. The resonant suspension system is configured to allow the reaction mass to oscillate relative to the frame with a corresponding resonant frequency.

According to another embodiment, there is a resonant source for generating low-frequency seismic waves. The resonant source includes a frame; a reaction mass configured to oscillate relative to the frame; a resonant suspension system connecting the reaction mass to the frame and including at least a pneumatic spring system; and a pneumatic valve fluidly connected to the pneumatic spring system and configured to supply compressed air for maintaining an oscillation of the reaction mass with a corresponding resonant frequency. The resonant suspension system is configured to allow the reaction mass to oscillate relative to the frame with the corresponding resonant frequency.

According to still another embodiment, there is a method for collecting seismic data during a seismic survey. The method includes deploying plural seismic sources over an area; deploying an additional low-frequency resonant source over the area; generating seismic waves with the plural seismic sources and the low-frequency resonant source; and recording seismic data generated by the plural seismic sources and the low-frequency resonant source. The low-frequency resonant source generates one or more frequencies less than 5 Hz by oscillating a reaction mass with a resonant suspension system that includes (i) a spring and a clamp spring system or (ii) a pneumatic spring system.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a low-frequency resonant source configured to generate low-frequency acoustic energy in a land environment. However, the embodiments to be discussed next are not limited to a land resonant source; they may be applied to other types of sources, e.g., a marine source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a traditional source system that likely includes vibrators that perform poorly in the very low-frequency spectrum (e.g., from 0.5 to 5 Hz) is augmented with one or more low-frequency resonant sources to improve the low-frequency spectrum. The output of various low-frequency resonant sources can fill in the energy often lacking in conventional land surveys. In one application, various low-frequency resonant sources are used in a seismic survey, each of which outputs low-frequency energy over a given portion of the low-frequency range of frequencies of interest. The very low-frequency range of frequencies is mainly considered to extend from 0 Hz up to about 5 Hz. Above 5 Hz, existing vibratory sources provide adequate source strength.

Figure 1:
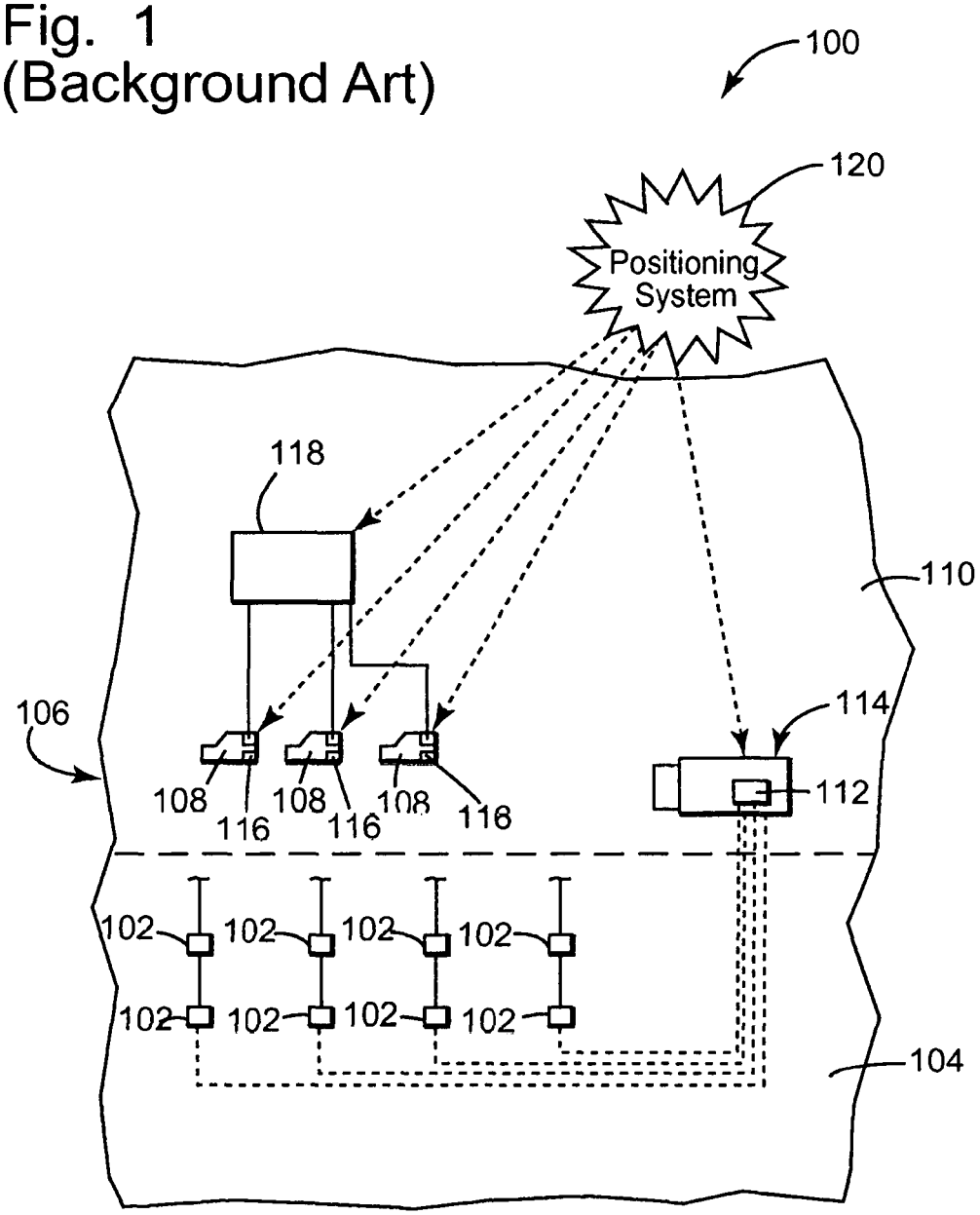
FIG. 1 is a schematic diagram of a land seismic acquisition system.
Figure 2:
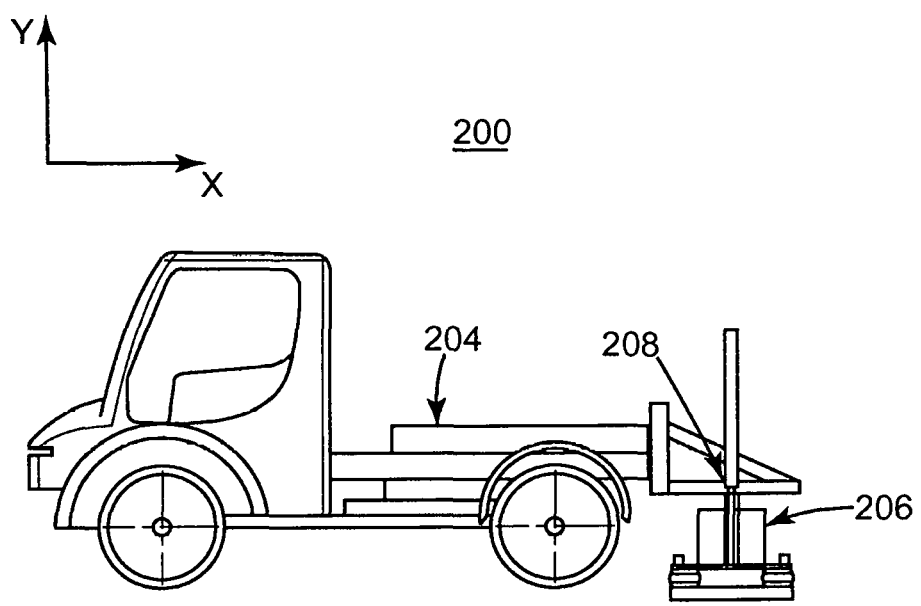
FIG. 2 is a schematic diagram of a land vibratory source.

Prior to discussing novel resonant sources designed to generate acoustic energy in the low-frequency range, a land vibratory source is introduced with regard to FIG. 2. System 200 includes a truck 204 on which the source 206 is provided. Source 206 is attached, for example, through a hydraulic lift system 208 to truck 204, and the hydraulic system raises or lowers the source as necessary. Once at the desired location, the hydraulic system lowers the source to contact the ground and applies part of the weight of the truck on the source. At this point, the source is ready to efficiently impart energy to the ground.

Figure 3:
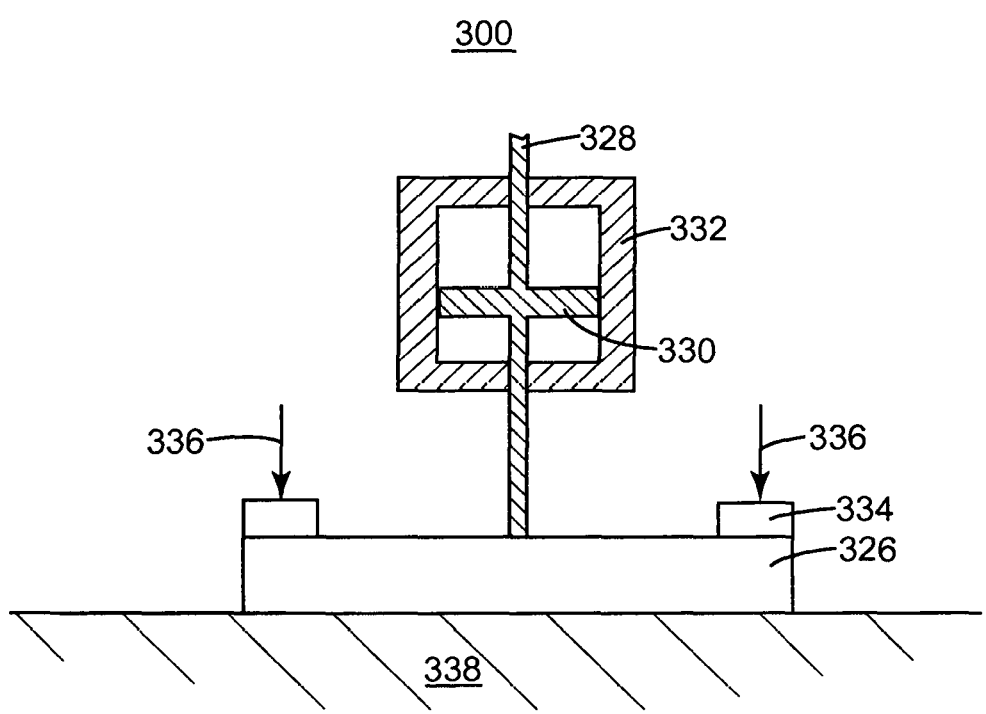
FIG. 3 is a detail of a land vibratory source.

An example of a servo-hydraulic vibratory source 300 is shown in FIG. 3. Source 300 may include a base plate 326 that connects to a rod 328. Rod 328 includes a piston 330 inside a reaction mass 332 that acts like a double acting hydraulic cylinder. Actuation of the reaction mass relative to the piston makes the base plate generate and impart energy into the ground. Isolation devices 334, for example airbags, may be provided on base plate 326 to transmit the weight 336 of vehicle 204 to base plate 326 while isolating base plate 326 motion due to sweeping from the truck 204. Base plate 326 is shown in FIG. 3 in contact with ground 338. An estimate of the dynamic force transmitted to the ground is equal to the mass of the base plate times its acceleration, plus the weight of the reaction mass times its acceleration. The weight of the vehicle prevents the base plate from losing contact with the ground. Many designs for the vibratory source exist on the market.

Figure 4:
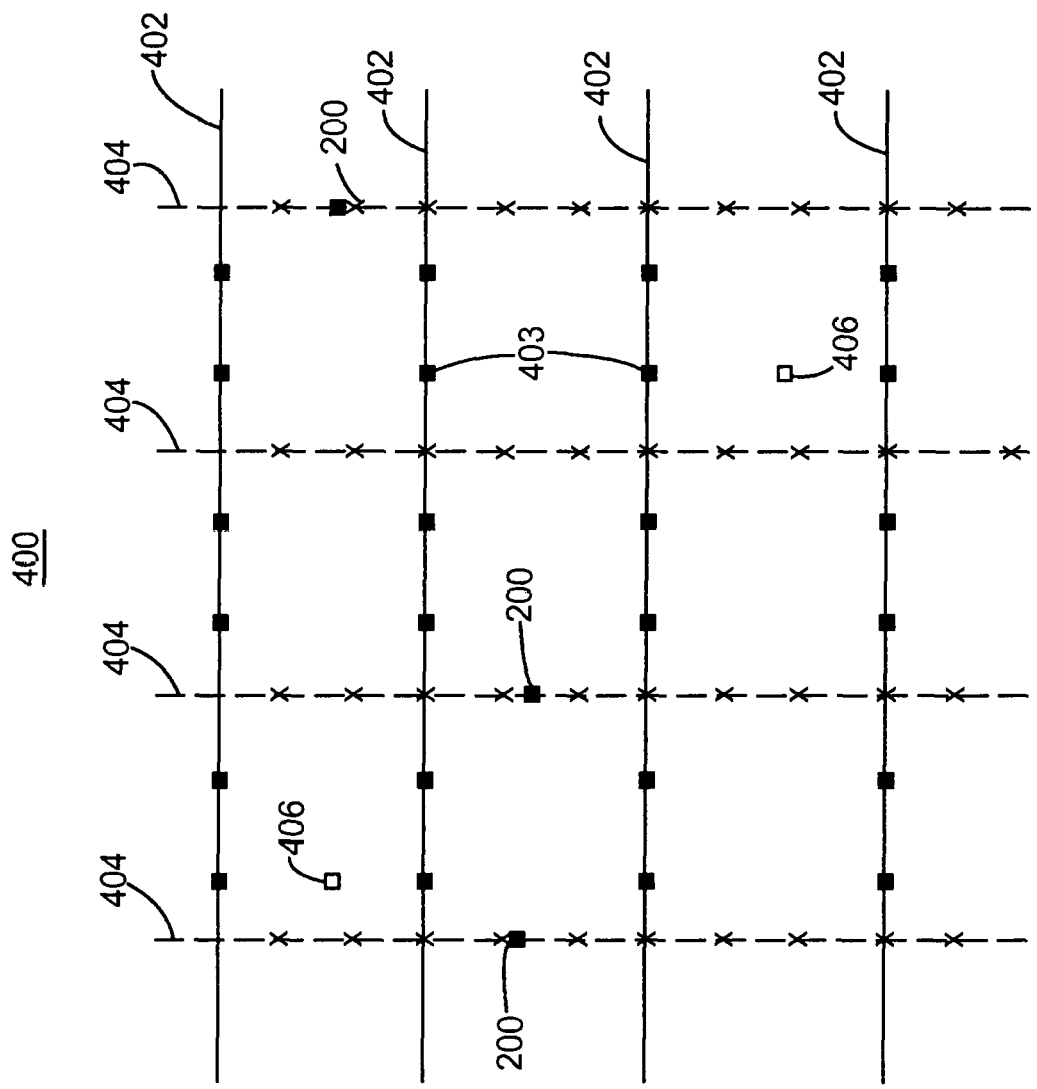
FIG. 4 illustrates a land seismic survey plot.

However, the low-frequency resonant source discussed in the following embodiments uses a different mechanism for generating low frequencies. Prior to discussing the low-frequency resonant source, a survey plan that uses one or more low-frequency resonant sources is considered. FIG. 4 shows a 3-dimensional (3D) survey plan 400. The receiver lines 402 and the conventional source lines 404 form a grid. Each receiver line 402 includes plural receivers 403 (e.g., geophones, accelerometers, etc.). In a conventional 3D survey, a vibratory source 200 may shake at a source point along line 404 every 5 to 20 m. In conventional shooting, the vibratory source 200 would execute a sweep that spans the full bandwidth of interest. It is important to note that, for low frequencies, the Fresnel zone is quite large and, therefore, the source spatial sampling does not need to be so fine. In practice, if the goal is to recover energy in the 0.5-5 Hz range, the spatial sampling could be more than an order of magnitude less than what might be required for conventional seismic sources that covers the 7-100 Hz range. However, the spatial sampling would need to be fine enough to remove the possibility of creating surface ground roll that is spatially aliased. Thus, a practical spatial sampling interval of about 200 m for the low-frequency source may be adequate.

For augmenting the frequency spectrum generated by the traditional sources 200 that execute sweeps over the frequency range where they are efficient (e.g., above 4 Hz), according to an embodiment, a separate set of transportable low-frequency resonant sources 406 may be employed to cover the frequencies that fall below the traditional sources' range. Because the spatial sampling requirement for low frequencies is less, the number of shot points for the low-frequency resonant source can be greatly reduced, as illustrated in FIG. 4, where it is possible to have 100 conventional shot points for conventional source 200 and only two shot points for low-frequency resonant source 406. In one embodiment, the time spent at a fixed location for the low-frequency sources 406 relative to the time spent at a fixed location for conventional source 200 can exceed a ratio of ten-to-one. In another embodiment, for example, for use in performing 4-D (time-lapse seismic surveys), the low-frequency resonant sources do not need to be moved. Thus, for this configuration, very long sweeps can be used to build up the low-frequency energy.

Figure 5:
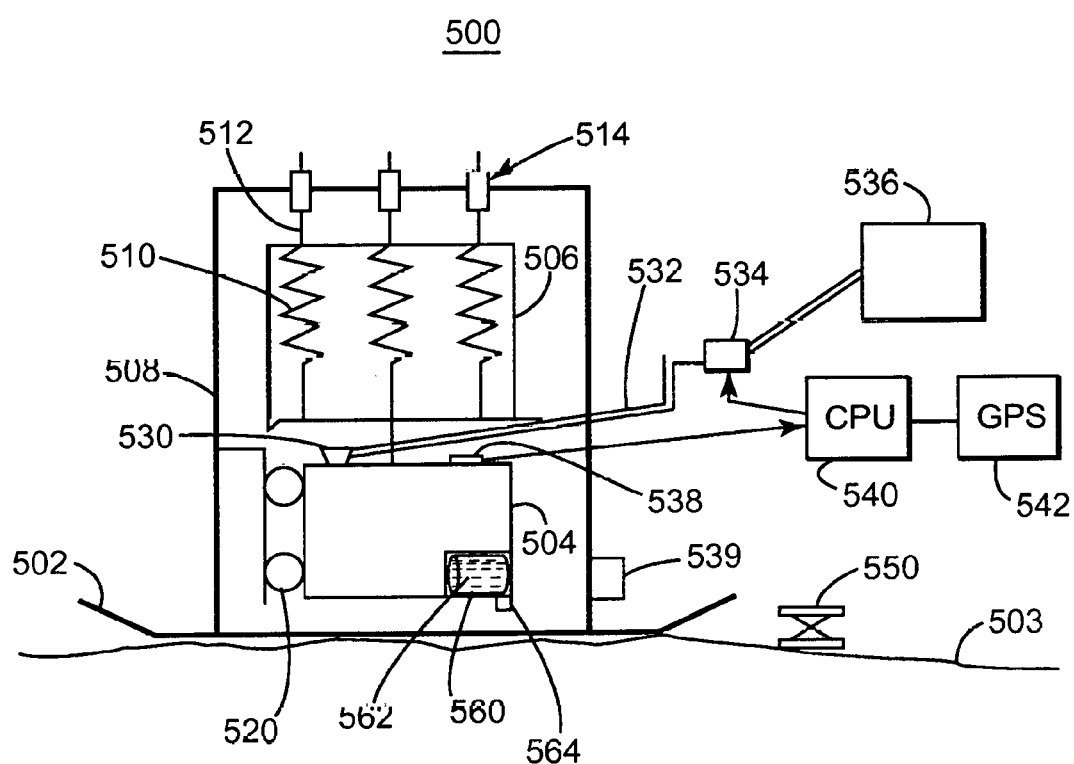
FIG. 5 illustrates a low-frequency resonant source.

A low-frequency resonant source is now discussed with regard to FIG. 5, which schematically shows some of the source's features. Those skilled in the art would recognize and the following embodiments describe various modifications that can be implemented with regard to this resonant source. The low-frequency resonant source 500 may be mounted on skids 502 or on wheels (not shown) and towed behind a truck or other vehicle. In one application, resonant source 500 includes a large reaction mass 504 (e.g., 1 to 4 tons in size) that is suspended by a resonant suspension system 506 from a support frame 508. Resonant suspension system 506 may include, for example, selectable springs 510 so that the oscillation frequency of reaction mass 504 is controllable. Those skilled in the art would recognize that resonant suspension system 506 may include other elements instead of springs, as will be discussed later.

Regarding the term "resonant" source, an analogy is discussed next to provide meaning to this term. Considering a simple pendulum, i.e., a mass m attached to the end of a string having a length I, a resonant frequency (natural frequency) of the pendulum is given by the mass m and the length I. Every mechanical object exhibits a resonant frequency, i.e., an intrinsic frequency. By changing either the mass m or the length I of the pendulum, the resonant frequency is changed. Similarly, a resonant source has its own resonant frequency. While a traditional source is driven within a desired frequency range that may or may not include the resonant frequency, the resonant source is driven at or near its resonant frequency. Note that the resonant frequency is characteristic for each source. In some embodiments, as will be discussed later, the resonant frequency can be adjusted and, thus, the resonant source can be driven with successive resonant frequencies. In one embodiment, the resonant source is driven only with the resonant frequency. Note that a traditional source is not intended to be driven with its resonant frequency.

In another embodiment, an actuator could be used to drive the reaction mass at a frequency slightly offset from the resonant frequency (for example offset by less than 0.1 Hz). This approach would be less efficient than driving at exactly the resonant frequency, but would provide a means to get some additional frequencies near the resonant frequency to get finer spectral sampling. In still another embodiment, the actuator could be used to drive the reaction mass over a very narrow band of frequencies, very near the resonant frequency, for example, covering a band Fn+/−0.1 Hz, where Fn is the natural or resonant frequency.

In this way, there should not be a need to have a spring rate for exactly every resonant frequency, i.e., it is possible to drive the resonant source slightly away from the natural frequency to cover more frequencies. Some loss of efficiency may occur, but this approach will benefit from the resonance effect providing some motion amplification.

In one application, selectable springs 510 are attached to support frame 508 with rods 512 that pass through a spring clamp system 514, which in this case includes lockable bushings. Bushings 514 may be retained by support frame 508. Support frame 508 is rigidly connected to skids 502 that are in contact with the earth's surface. If one or more of the bushings is locked, a spring mass system is obtained having the resonant frequency of the system mainly determined by the size of reaction mass 504 and the spring rate constant of resonant suspension system 506 (springs 510 for the case illustrated in FIG. 5). Note that by clamping the number of springs locked by bushings or by changing the number of springs present in the resonant suspension system, a resonant frequency of the resonant suspension system is changed. In other words, the effective spring constant would change based on the number of active springs or the number of active coils for each spring. In one application, the locking mechanism may also be used to "partially lock" a spring, i.e., arrest "n" number of coils of the spring, thereby affecting the spring coefficient K for that particular spring and also affecting the overall spring coefficient?

Reaction mass 504 can optionally be constrained to only oscillate vertically by a roller bearing guide mechanism 520 that is also connected to frame 508. Those skilled in the art would recognize that other guide mechanisms may be employed to guide the reaction mass, and the arrangement of selectable springs illustrated in FIG. 5 is only one of many ways to realize an adjustable spring rate. In one application, a nested spring system may be used.

If there is not much friction between the various components of resonant source 500, very little energy is required to cause reaction mass 504 to move up and down and to maintain this movement to generate the desired low frequencies. Further, if the exciting energy is well-timed, it can create large displacements of the reaction mass and large resultant forces. The forces due to the reaction mass's vertical acceleration can be imparted into the earth surface through resonant suspension system 506, which is connected to frame 508, and then to earth surface 503 through skids 502.

To excite the reaction mass, various mechanisms may be used. One such mechanism illustrated in FIG. 5 includes an air nozzle 530 positioned next to reaction mass 504 so that compressed air can be delivered on reaction mass 504 to make it oscillate. Nozzle 530 is connected through an air hose 532 to a pneumatic valve 534 that is connected to a supply of compressed air or an air compressor 536. To time and adjust the volume of air used to excite the reaction mass oscillation, an accelerometer 538 (or another sensor) is attached to reaction mass 504 and its output connected, as a feedback signal, to a controller/acquisition system 540. In another embodiment, an actuator (electromagnetic, linear motor, hydraulic cylinder, or pneumatic cylinder) is mounted so as to direct opposing forces between mass 504 and frame 508 and/or base plate 502 to excite the reaction mass 504 either continuously or in a timed-pulse fashion. Accelerometer 538 provides a signal that controller 540 uses to determine how much the reaction mass is moving, and if pneumatic valve 534 is just a poppet valve, the air blast time duration. Thus, nozzle 530 is controlled to generate a small amount of thrust to act on the reaction mass to force it down (and/or up).

One of the benefits of a resonant source (i.e., a system that oscillates at its resonant frequency, which is given by the physical configuration and the specifics of the source components) is that it tends to produce low-harmonic distortion signals, with harmonics more than 50 dB lower than the fundamental frequency in well-designed systems. On the contrary, existing hydraulic seismic vibrators are notorious for generating high levels of harmonics when operating at low frequency. Thus, a resonant source as described with regard to FIG. 5 should provide a much purer tone than a conventional vibratory source.

The embodiment of FIG. 5 may also include a jack mechanism 550 that is helpful for raising/supporting reaction mass 504 to a neutral position when the bushings are locked/unlocked. Alternately, a winch mechanism might be attached to frame 508 instead of a jack mechanism to act as a hoist system for reaction mass 504.

In operation, reaction mass 504 is raised by jack mechanism 550 so that springs 510 are neither under compression nor tension. One or more of bushings 514 are locked into place, and the unlocked bushings allow the rod attached to its respective spring to freely glide. If a multiple spring system is used as shown, then the more bushings that are locked at a given time, the greater the spring rate and the higher the resonant frequency. The operator of the resonant source may have a schedule of what frequencies are to be emitted and what the spring settings need to be.

Once the selected bushings are locked, the jack is removed. Controller 540 may be connected to a global positioning system (GPS) clock 542 and logs the time the sweep begins; it enables the pneumatic system and regulates the air pulses delivered by nozzle 530 by controlling valve 534. At the same time, mass acceleration is recorded by controller 540. Optionally, a second accelerometer 539 can be located on the frame or skids to provide an estimate of frame acceleration so that a ground contact force estimate can be made.

While the conventional 3D survey is being performed, the low-frequency resonant source 500 is being excited and the energy radiated by it recorded by the seismic receivers 403 located along receiver lines 402. After the low-frequency resonant source has emitted energy at one frequency for the prescribed length of time, which might be 10 minutes or more, the process is repeated and a new spring setting is made to emit the next scheduled frequency, which is different from the previous frequency. Emissions from the low-frequency resonant source need not be synchronized precisely with the conventional source emissions because the emission bandwidth is very small, and band-pass filtering of the data in later processing steps will enable extraction of the low-frequency contributions of the resonant source from the overall seismic data.

The schedule of low-frequency sweeps, their frequencies and duration, are logged by controller 540, and the source signals are also recorded (accelerations are recorded). In practice, the resonant source will not produce a continuous spectrum. However, for the acoustic inversion method, the frequency spectrum need not be continuous. Thus, as a practical matter, in one application, spring combinations that can produce frequencies separated by, for example, several tenths of Hz are sufficient. Such an example includes a low-frequency spectrum made of ten discrete frequencies: 1.5, 1.75, 2, 2.25, 2.5, 2.75, 3, 3.25, 3.5, and 3.75 Hz. The conventional sources of the survey may be sweeping in the range of about 4 to 100 Hz. In another embodiment, a small mass and/or masses could be attached and/or removed from reaction mass 504 and used in combination with adjustable resonant suspension system 506 to create more resonant frequencies, for example, in order to create a range of discrete frequencies with finer spectral spacing.

Another option would be to choose frequencies that increase logarithmically with the duration for each sweep, the duration being greater for the very low frequencies where ambient noise is greater due to both increase in electronic noise and also vibrations associated with tides, earth tremors etc. For example, one resonant source excitation schedule might look like that shown in Table 1.

TABLE 1

| Frequency (Hz) | Excitation time (s) |
| --- | --- |
| 0.5 | 9850 |
| 0.625 | 6313 |
| 0.975 | 4047 |
| 1.21 | 2594 |
| 1.5 | 1663 |
| 1.875 | 1066 |
| 2.34 | 683 |
| 2.9 | 438 |
| 3.6 | 280 |
| 4.5 | 180 |
| Total time | 25451 |

Alternatively, the resonant source could be modified/adapted to enable a sweep mode. For example, if a portion 560 of reaction mass 504 shown in FIG. 5 were actually a tank filled with a fluid 562, a valve 564 could be connected to portion 560 to fluidly communicate fluid 562 with the ambient or an external reservoir (not shown). Thus, by letting fluid 562 slowly drain from portion 560, reaction mass 504's weight would decrease and the resonant frequency would increase, thereby creating a swept sine wave source. In another embodiment, sand (also metal shot, glass beads or other "flowable" material) could be used instead of fluid with a control gate used to meter the flow rate of sand being released.

In one application, with fluid 562 slowly draining, the resonant source could be made to sweep from 0.5 Hz up to 2 Hz over a predetermined length of time. The rate that the fluid drains would change the instantaneous effective sweep rate. If a proportional valve were used instead of valve 564, the frequency can be controlled by controller 540 to meter out the fluid at a prescribed rate to achieve a desired instantaneous excitation frequency at a predetermined time.

Variations of the embodiment shown in FIG. 5 are now discussed. With regard to FIG. 6, another low-frequency resonant source 600 is illustrated that has an adjustable resonant suspension system. More specifically, low-frequency resonant source 600 includes a solid basis 602 (e.g., one or more pads) that achieves the coupling with the earth. In an embodiment, reaction mass 604 hangs from frame 606 via a spring 619 (for example an extensional coil spring). Resonant suspension system 618, includes a moveable spring clamp system 630 comprised of clamp 634 that engages spring 619 to select the portion of spring 619 that is active. Clamp 634 is activated or released for example by square shaft 638 (or spline or keyed shaft) that can slide freely up and down inside clamp motor 636, but can be turned by clamp motor 636. In an embodiment, when clamp 634 is disengaged from spring 619, by the rotation of shaft 638, spring 619 carries the full weight of the reaction mass 604 and is sized to support reaction mass in the mid position of its stroke.

In an embodiment, to change the resonant frequency of the source, clamp 634 is raised (lowered) by ball screw actuator 608, which is mounted on vertically moveable plate 675 attached to guide columns 632A-D that are attached to clamp 634. Guide columns 632A-D pass through holes in plate 673 that is attached to frame 606. Plate 673 is equipped with linear bearings/bushings 674 that provide a sliding engagement with frame 606 to provide lateral support for spring clamp system 630, but still allow free vertical travel. Ball screw actuator 608 drives shaft 676 that is attached at one end to frame 606 by plate 673. When a new resonant frequency is selected, controller 640 activates clamp motor 636 and thereby clamp 634 disengages spring 619. Then, ball screw actuator 608 is activated by controller 640 to raise (or lower) plate 675 that is attached to clamp 634 through guide columns 632A-D. When clamp 634 is in the new operating position, controller 640 stops ball screw actuator 608 and then activates clamp motor 636 to engage spring 619. At this point, spring 619 has an active section 622 and an inactive section 620. In one application, inactive section 620 carries a static bias force equal to the weight of the reaction mass so that when the reaction mass 604 is at its center position, shaft 676 does not bear this load. The effective spring rate of active spring section 622 and the reaction mass 604 will determine the resonant frequency.

In one application, actuator 608 is a ball screw linear actuator configured to raise or lower clamp 634 so that an effective length of the spring 619 can be changed. Actuator 608 is also configured to provide an excitation signal to drive resonant suspension system 618, either to make it move, or to provide energy to overcome friction in the system to sustain the movement of reaction mass 604. For example, if the resonant frequency selected was 1 Hz, then ball screw actuator 608 could be driven by controller 640 up and down in a sinusoidal fashion to produce 1 Hz. Because the system is operated at or near resonance, only a relatively small amount of dynamic vertical travel of clamp 634 is required to generate a large amount of reaction mass displacement to produce adequate reactive force that can be transmitted into the ground. Not shown is a reaction mass brake that can be used to stop the reaction mass oscillation and could be included as part of the guiding system 650 discussed next.

Figure 6:
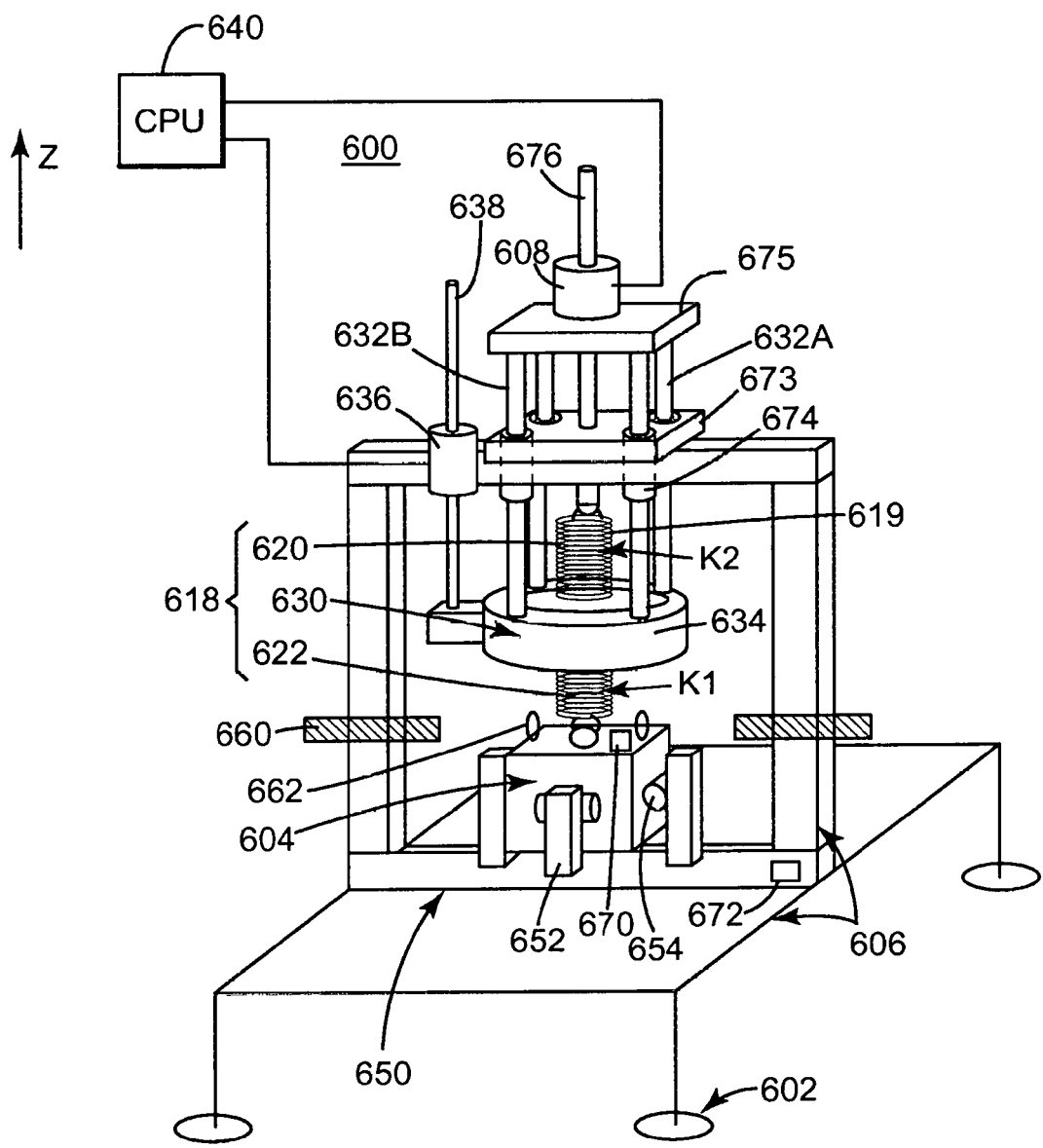
FIG. 6 illustrates another low-frequency resonant source.

In one application, reaction mass 604 is in contact with a guiding system 650 that guides the reaction mass along vertical direction Z. Guiding system 650 may include, for example, poles 652 that encircle reaction mass 604 and also rollers 654, located between poles 652 and reaction mass 604. Rollers 654 may be in direct contact with reaction mass 604. Suspension bars 660 may be attached to frame 606 and may be configured to approach mating elements 662, which are fixed to reaction mass 604. When in use, suspension bars 660 are moved away from the reaction mass as illustrated in FIG. 6 so that the reaction mass can freely oscillate with a corresponding resonant frequency. However, when the resonant source needs to be moved to another location, suspension bars 660 are engaged to mating elements 662 to prevent the reaction mass from oscillating. Those skilled in the art would recognize that other means for achieving this goal may be used. Various sensors 670 and 672, similar to those discussed with regard to FIG. 5, may also be located on resonant source 600. For simplicity, these sensors and their descriptions are omitted in the following embodiments, but those skilled in the art would appreciate that these sensors are used to measure various source-related signals, as discussed later.

Figure 7:
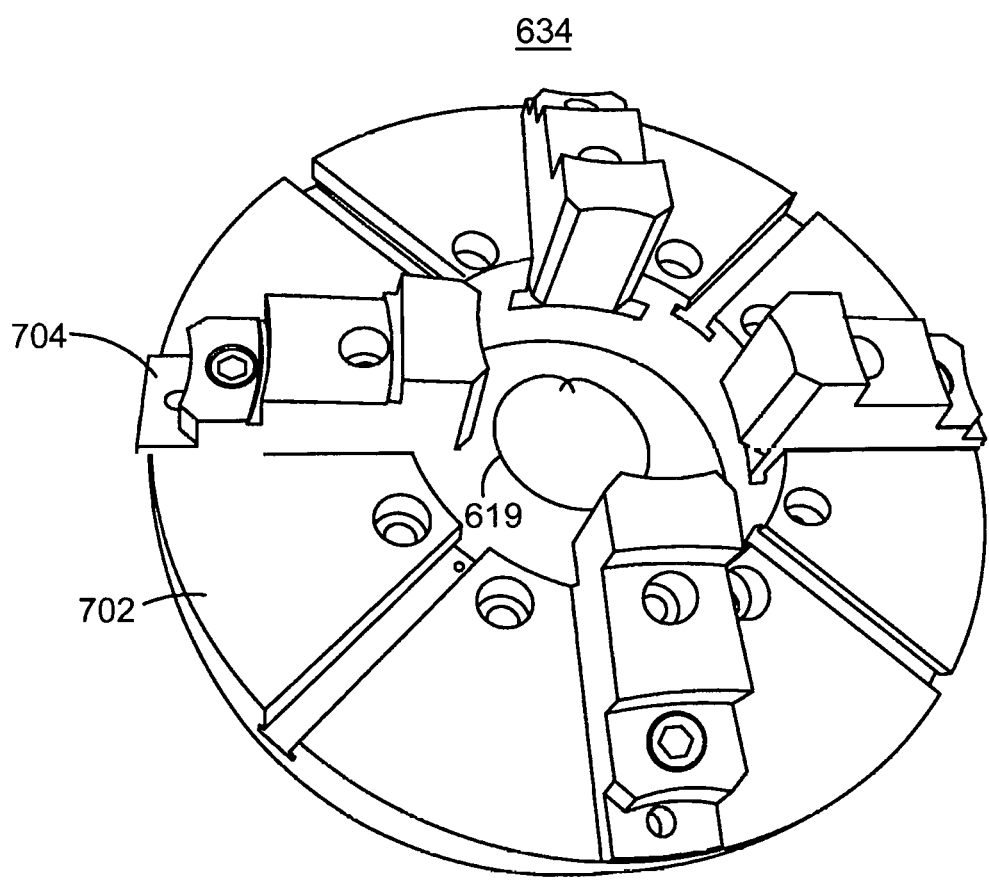
FIG. 7 illustrates a clamp of a low-frequency resonant source.

A few details are now provided about some elements of this resonant source. Clamp 634 may include, for example, as illustrated in FIG. 7, a chuck 702 having one or more jaws 704. Jaws 704 may be manually or automatically actuated to engage spring 619 for fixing the upper part 620. The chuck may be light-duty and lightweight because it does not have to support the static load (i.e., reaction mass 604), but just immobilize the spring. Instead of the clamp shown in FIG. 7, it is possible to have a chain locked collar, or a spring clamping collar or a spring collet, etc.

Figure 8:
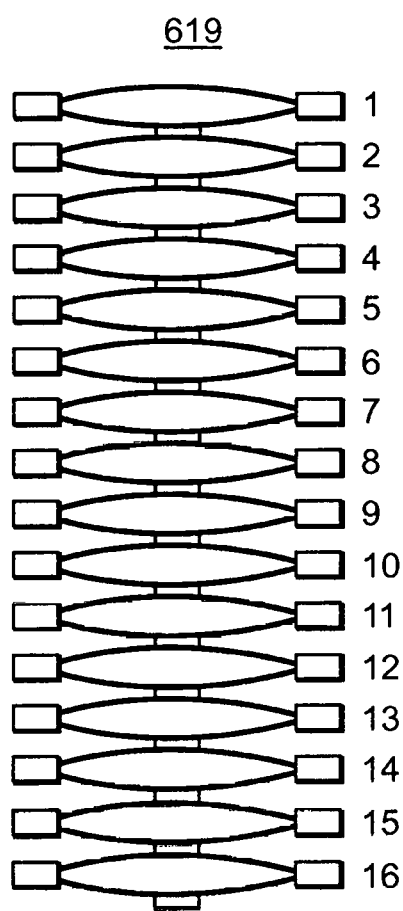
FIG. 8 illustrates a spring of a low-frequency resonant source.

Regarding spring 619, in one application, it may include 16 diaphragm or flexural spring elements no. 1 to 16, each with a different spring rate. The spring elements are shown in FIG. 8 being connected in series, each mounted in an annular ring. In one embodiment, the 16 springs form 16 steps, and each step increases by $\frac{1}{8}^{th}$ Hz from the previous step. Thus, it is possible to just index through the elements to select the desired spring rate. In other words, spring no. 16 is the stiffest and spring no. 1 is the weakest. The combination of springs 1 to 16 may be for the 1 Hz frequency, while using only spring no. 16 achieves the 3 Hz frequency. Those skilled in the art would recognize that other spring combinations may be used for obtaining the low-frequency range.

Figure 9:
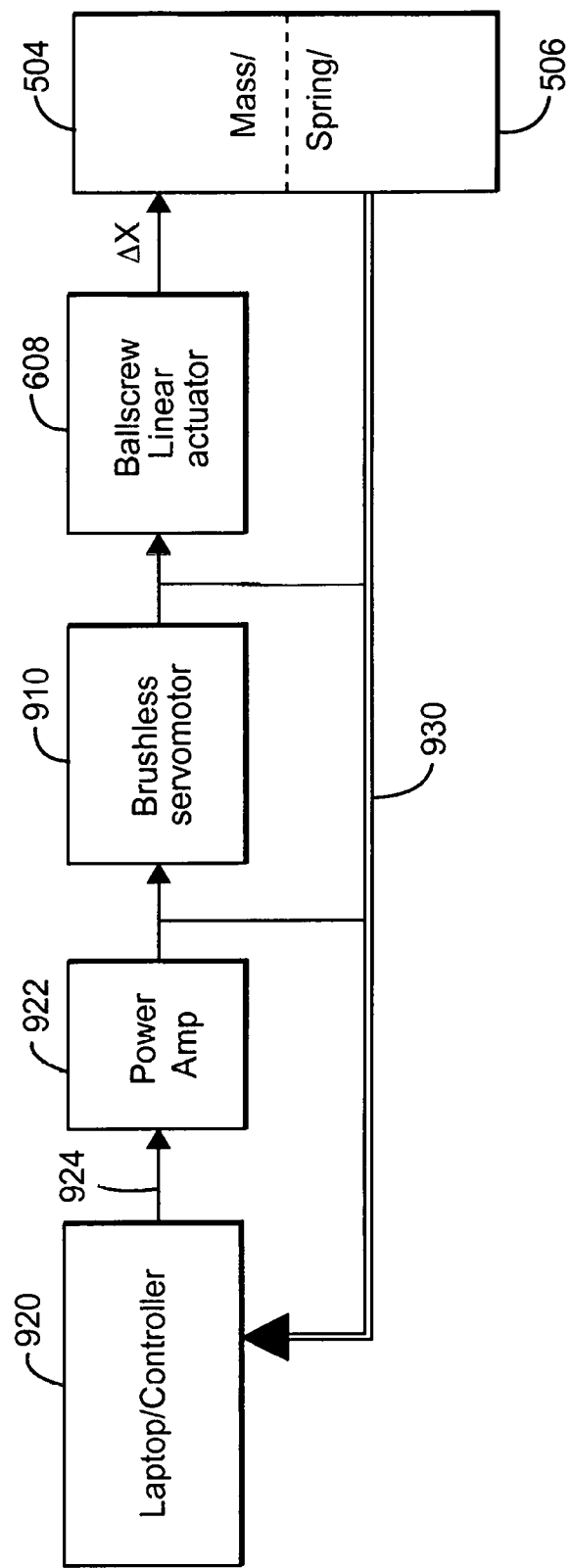
FIG. 9 is a schematic diagram of a control loop for driving a low-frequency resonant source.

The above-noted low-frequency resonance sources may be driven as now discussed. As illustrated in FIG. 9, mass spring 504 and resonant suspension system 506 are driven by actuator 608. A motor 910, e.g., brushless servomotor, drives actuator 608. Controller 920 (which may be a processor or a computer, etc.) stores the frequencies that need to be generated (e.g., Table 1) and drives motor 910 so that each frequency is generated for reaction mass 504. Controller 920 may also be configured to receive a set of shot frequencies from a command center, e.g., through radio or any other wireless communication protocol. Controller 920 may also select a different frequency (as already discussed above) to drive the reaction mass. An optional power amplifier 922 may be located between controller 920 and motor 910 for amplifying the driving signal 924 from the controller. One or more measured signals 930 are generated at the reaction mass/resonant suspension system that are fed back to actuator 608, and/or motor 910 and/or controller 920. Measured signal 930 may be one or more of motor shaft position, motor shaft velocity, reaction mass acceleration, clamp acceleration, pad acceleration, frame acceleration, clamp position, drive current, drive voltage, etc.

Figure 10:
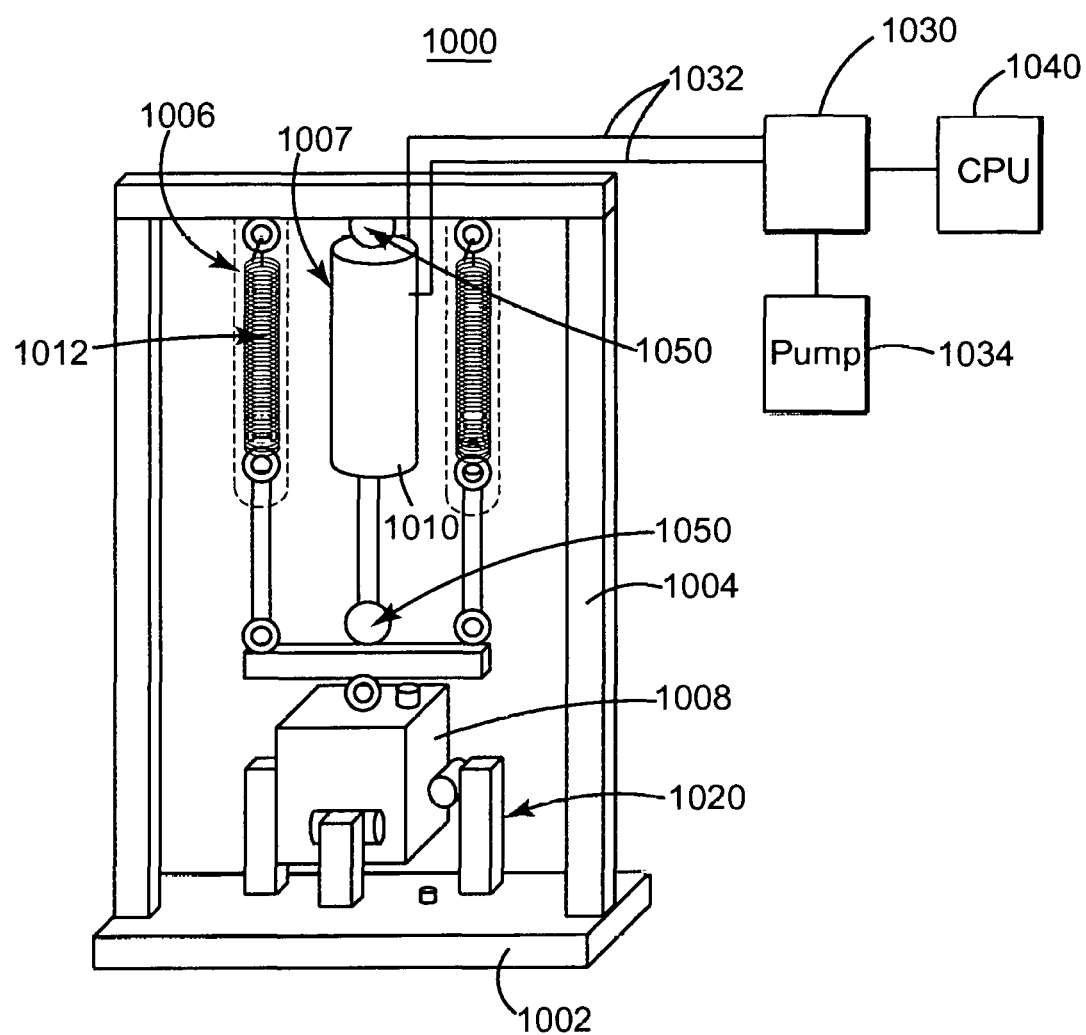
FIG. 10 illustrates still another low-frequency resonant source.

According to another embodiment, instead of just using metal springs for resonant suspension system 506, it is possible to also use a pneumatic spring system as now discussed with regard to FIG. 10. Low-frequency resonant source 1000 includes a frame 1004, to which a resonant suspension system 1006 (a pneumatic spring system in this case) is attached. Reaction mass 1008 is attached to one end of resonant suspension system 1006. Guiding system 1020, similar to that discussed with regard to FIG. 5, may be provided. Resonant suspension system 1006 may include a pneumatic spring system 1007 that includes a double-acting air cylinder 1010 as a pneumatic spring, and one or more springs 1012 that also connect frame 1004 to reaction mass 1008.

The spring rate of pneumatic spring system 1007 can be changed by adjusting the air pressure inside cylinder 1010. This approach may provide an easier way to change the effective spring rate. Spring 1012 may be used in parallel with air cylinder 1010, but it is a fixed spring and is used to help offset the weight of the reaction mass. In one application, a coil spring is selected for lowest resonant frequency. The overall spring rate is changed by changing the pneumatic pressure in cylinder 1010. This can be achieved by connecting a pneumatic valve or pressure regulator 1030 to cylinder 1010 through appropriate pneumatic pathway 1032. Controller 1040 may be connected to pneumatic valve 1030 for controlling the amount of pressure supplied to cylinder 1010 to achieve a desired resonant frequency. Controller 1040 may store a number of frequencies, e.g., those noted in Table 1, and may be programmed to sequentially achieve each of those frequencies by adjusting the air pressure inside cylinder 1010. Pneumatic valve 1030 may be connected to a compressed air source 1034, which may be a compressor, pump, reservoir, etc. In one application, cylinder 1010 may be connected through ball, clevis or hinged joints 1050 to frame 1004 and reaction mass 1008. Any other type of connection may be used. In an embodiment, pneumatic cylinder 1010 can also be used to excite reaction mass 1008 by varying dynamically the pressures inside double acting cylinder 1010 if valve 1030 is a pneumatic servovalve controlled dynamically by controller 1040.

Figure 11:
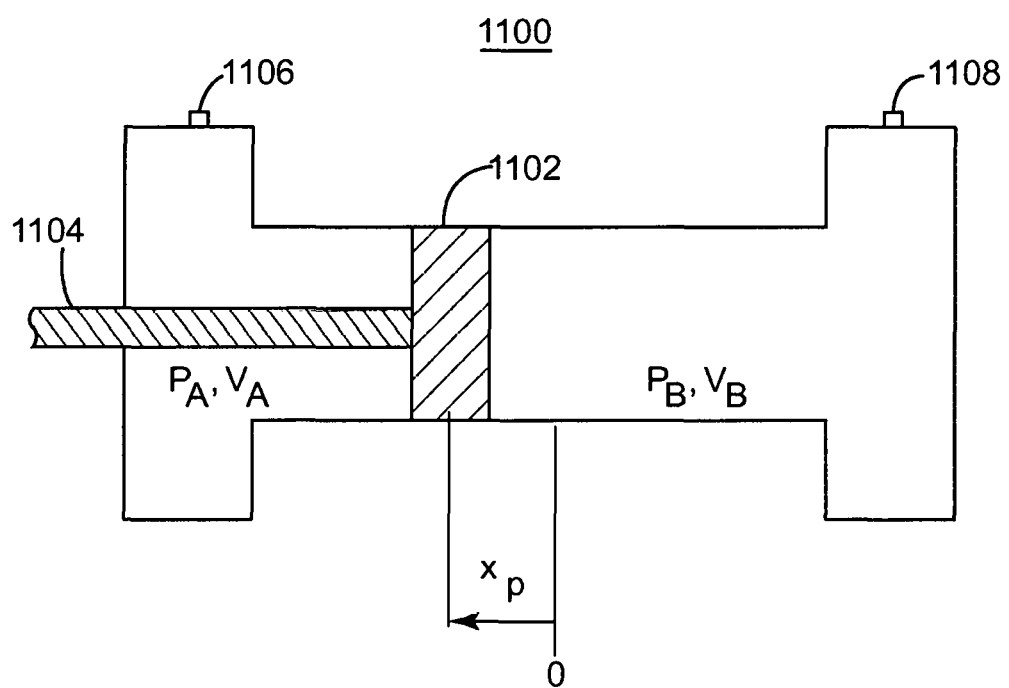
FIG. 11 illustrates a compressed air cylinder that is part of a low-frequency resonant source.
Figure 12:
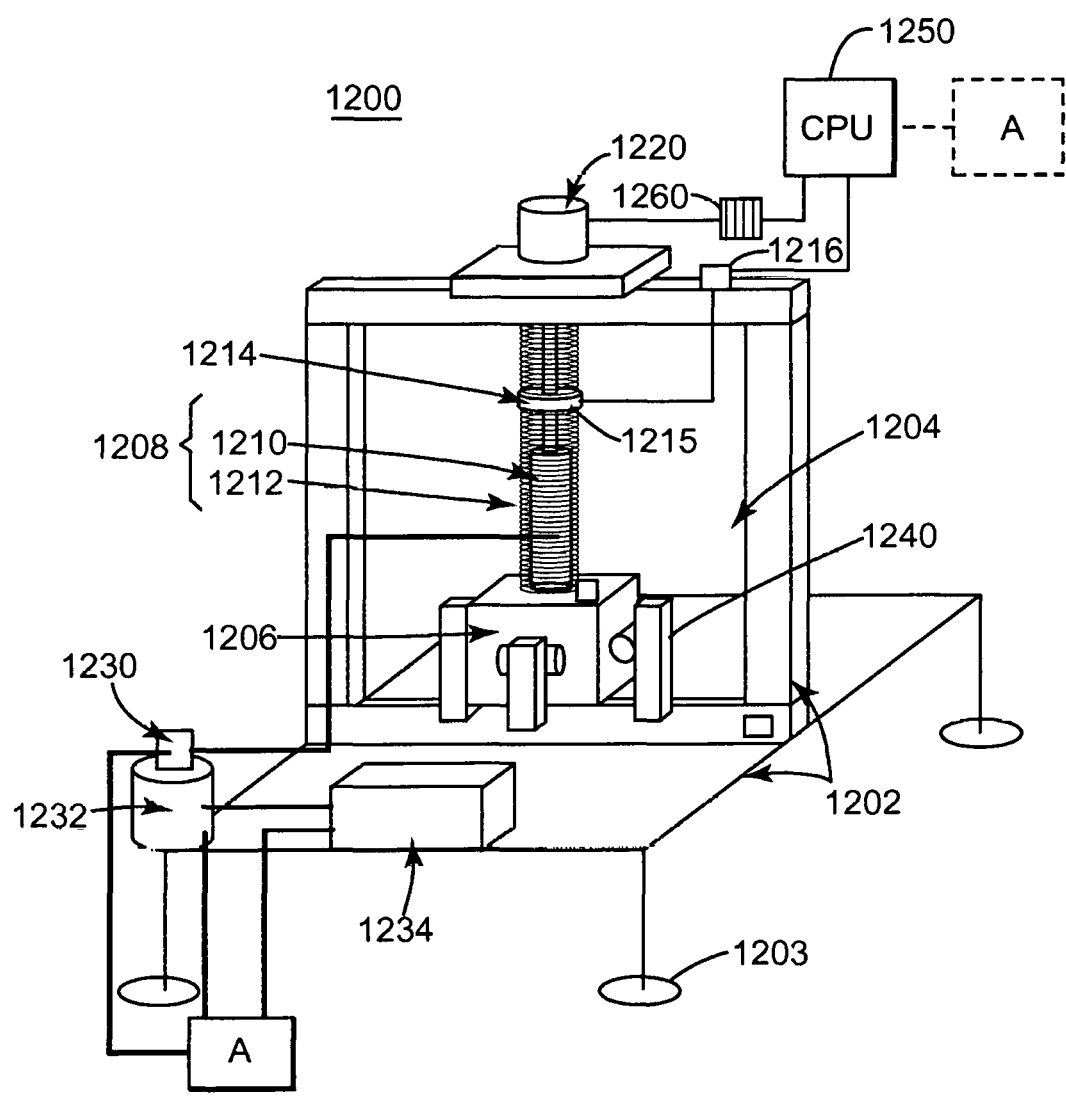
FIG. 12 illustrates yet another low-frequency resonant source.

With regard to the air cylinder 1010, FIG. 11 shows one implementation of such a cylinder. Cylinder 1110 may include a piston 1102 configured to move inside the cylinder. The cylinder may be sealed so that air from inside generates a spring constant proportional with the air pressure. Piston 1102 may be connected to a rod 1104 that exits the cylinder. Cylinder 1108 may be attached to the frame of the resonant source as shown in FIG. 10 or to the reaction mass 1206 as shown in FIG. 12, while rod 1104 may be attached, directly or indirectly, to reaction mass or the frame. One or more ports 1106, 1108 are connected to cylinder to provide the pressurized air from pneumatic pathways 1032. The effective spring rate $K_{air}$ of the cylinder is a function of the static charge pressure (Pset) and piston displacement Xp. The air cylinder combines the spring rates in both the upper and lower chambers.

Because the effective spring rate varies inversely with the change in volume, the spring rate changes with piston position. This is a nonlinear effect that leads to harmonic distortion. By increasing the cylinder's volume, the change in spring rate becomes less significant. One approach for increasing the linearity of the spring rate and, at the same time, for decreasing the overall length/height of the pneumatic spring system, would be to increase the cylinder bore at each end (outside the piston operating region as illustrated in FIG. 11), or to add external reservoirs. An advantage of the pneumatic spring is the ease with which the spring rate can be changed. A disadvantage of the air cylinder compared to the coil spring is the higher damping due to several effects as: piston and seal friction, leakage, and fluid compression heat loss.

Another version of the low-frequency resonant source is now discussed with regard to FIG. 12. Low-frequency resonant source 1200 includes a basis 1202 connected to a frame 1204. Basis 1202 may have wheels (not shown) for transporting the resonant source where desired, and the wheels may be raised so that the entire resonant source is supported by pads 1203, which ensure a good coupling with the ground. Reaction mass 1206 is suspended by resonant suspension system 1208, which includes pneumatic cylinder 1210 and, optionally, spring 1212. In terms of the resonant suspension system, this embodiment combines the spring of the embodiment illustrated in FIG. 6 and the pneumatic cylinder illustrated in FIG. 10. Thus, resonant source 1200 also includes the spring clamp system 1214 with clamp 1215, clamp motor 1216, actuator 1220 for actuating spring 1212 and/or cylinder 1210, pressure control valve 1230 (e.g., a three-way valve) for controlling air pressure supplied to cylinder 1210, compressed air source 1232, which may be a high-pressure reservoir, and a compressor 1234 for generating compressed air inside compressed air source 1232. Source 1200 may also include guiding system 1240 and one or more sensors as discussed with reference to FIG. 5. A controller 1250 may be connected to a motor 1260 for driving actuator 1220, which in turn drives clamp 1214 up and down to excite reaction mass 1206 through cylinder 1210 and spring 1212. Controller 1250 may also be connected to motor 1260 for adjusting the spring rate of spring 1212, to motor 1216 for engaging/disengaging clamp 1214, to valve 1230 for controlling an amount of compressed air being supplied to cylinder 1210, and to compressor 1234 for controlling the pressure inside compressed air source 1232.

Figure 13:
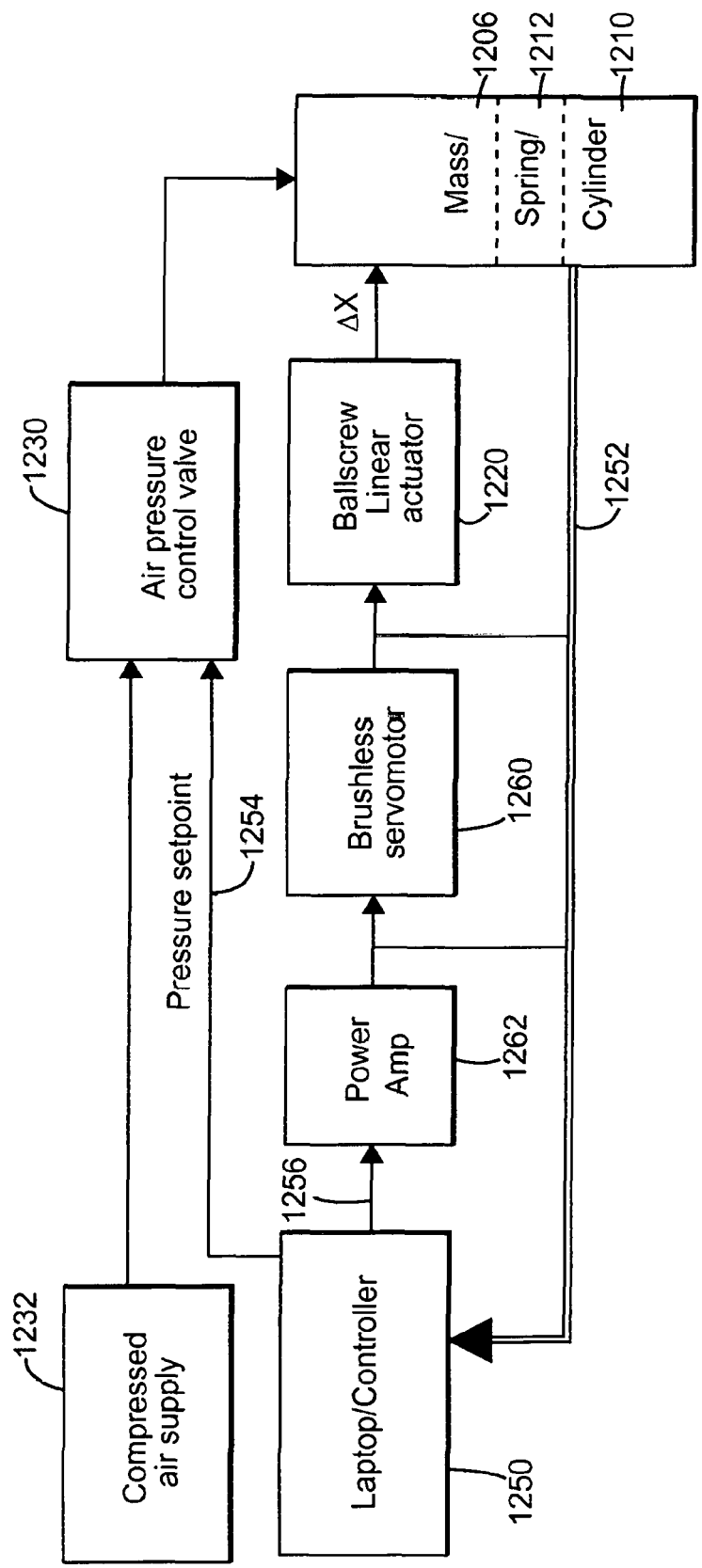
FIG. 13 is a schematic diagram of a control loop for driving another low-frequency resonant source.

When in use, low-frequency resonant source 1200 may be driven as now discussed with regard to FIG. 13. Controller 1250, based on measured signals 1252 that may include motor shaft position, motor shaft velocity, reaction mass acceleration, frame acceleration, clamp position, drive current, drive voltage, or pneumatic cylinder pressure, sets up a pressure setpoint 1254 for control valve 1230 so that cylinder 1210 achieves a pre-calculated spring constant. At the same time, controller 1250 also determines a driving signal 1256 that is applied to motor 1260, after being amplified by power amplifier 1262, so that actuator 1220 drives spring 1212 and/or cylinder 1210 with a desired resonant frequency. Note that spring 1212 and cylinder 1210 are connected in parallel to reaction mass 1206. Also, controller 1250 may be configured to control clamp 1215's position so that a resonant frequency can be adjusted as needed. Variations of the embodiments discussed herein are also contemplated, and any combinations of the features discussed above may also be envisioned when implementing in practice a low-frequency resonant source.

Figure 14:
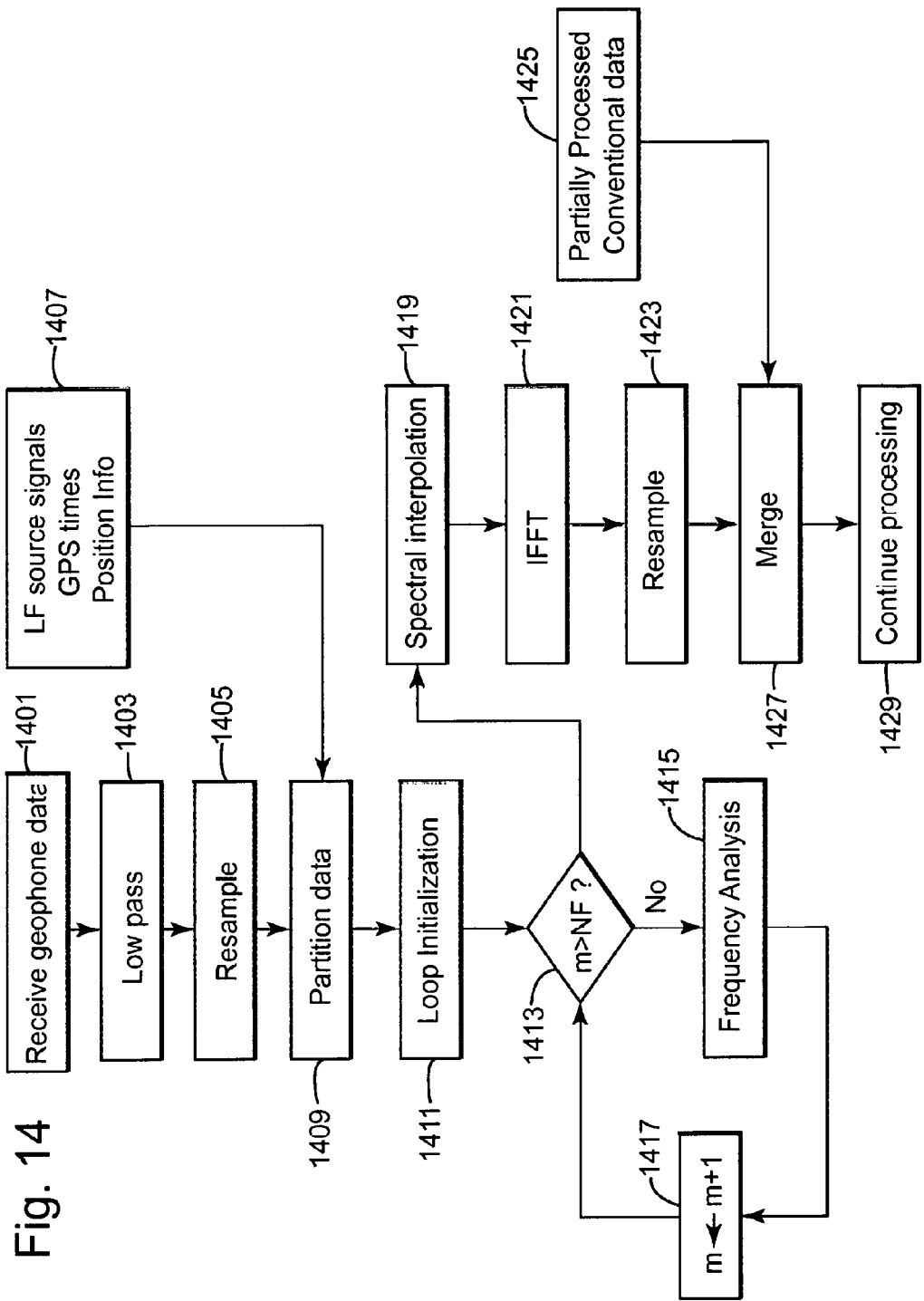
FIG. 14 is a flowchart of a method for combining and processing low-frequency seismic data and conventional seismic data.

A method for combining seismic data acquired with traditional sources and seismic data acquired with one or more of the low-frequency resonant sources discussed in the above-noted embodiments is now discussed with regard to FIG. 14. Starting in step 1401 with the seismic data that was acquired, preferably, using a continuous or semi-continuous recording scheme, the receiver (e.g., geophone or accelerometer) data set is low pass (could be band-pass) filtered in step 1403 to remove the energy contribution due to conventional seismic sources, typically energy above about 5 Hz. Note that the seismic data includes contributions from both traditional sources and low-frequency resonant sources because these sources may be fired at the same time, with or without a time delay.

The resulting low-frequency data can then be downsampled in step 1405 to reduce the data volume. In step 1409, the low-frequency filtered data is partitioned into records by matching up time stamps and other source information provided in step 1407. The source information is related to the low-frequency resonant source, and it may include reference signals, GPS firing times, location information, etc. Source information 1407 may also contain low-frequency source signatures that preferably have already been low pass filtered and have a compatible sampling rate as the data output in step 1405. The source signatures are paired with the received data records. Each partitioned record resulting from step 1409 represents the signal emitted and received for each discrete frequency emitted by the resonant source, for example, the frequencies shown in Table 1. Thus, in one embodiment there are NF of these frequencies of interest, for example NF=10 for Table 1.

Steps 1413, 1415 and 1417 describe a loop that increments a discrete frequency index "M." The loop is initialized in step 1411. For each discrete frequency, the phase and amplitude relationship, expressed as a complex number, between the source signal and the received signal is computed. This is achieved, for each receiver location, in step 1415, to produce an array of complex numbers for that discrete frequency. The loop continues to produce an array of complex numbers for each discrete frequency until all emitted frequencies are computed. This set of complex numbers represents the low frequency response of the earth transmission path from the source to the receiver. Then, the process advances to step 1419, where an optional step of spectral interpolation is performed to estimate the overall low-frequency transfer function measurement between the source and each receiver. Note that if the original data has adequate spectral sampling, then no spectral interpolation is required and the data passes through. The result is a transfer function estimate that would cover, for example, the low-frequency band of 0.5 to 4.5 Hz. Those skilled in the art would recognize that other values are possible for the low-frequency band.

The resultant number of spectral lines after interpolation will determine the length of the time representation of the earth low-frequency impulse response after step 1421, which is an Inverse Fast Fourier Transform (IFFT). The finer the spectral resolution entering into step 1421, the longer the impulse time response estimate. In one application, spectral interpolation may not produce valid results in some cases, and for those situations, the original frequency resolution needs to be increased.

In step 1421, the frequency response is transformed into a time domain representation of the earth low-frequency impulse response. If the sample interval does not match the sample rate used in the conventional data set, then the data will need to be resampled as indicated in step 1423.

In step 1427, the low-frequency earth impulse response estimates for each receiver position are integrated with the conventional data set that has been processed in step 1425 to provide an earth impulse response covering the conventional seismic frequencies. Because the source locations for the low-frequency resonant sources are fewer than for the conventional sources, some corrections to compensate for the difference in source locations will need to be applied.

After the conventional seismic and the low-frequency seismic earth impulse responses were merged in step 1427, the process advances to other processing steps 1429 to eventually generate the image of the surveyed subsurface. Some of these steps may be, for example, normal moveout (NMO) corrections, ground roll removal, despiking and other noise removal operations.

Seismic data generated by the seismic sources discussed above and acquired with the receivers may be processed in a corresponding processing device to generate a final image of the surveyed subsurface.

Figure 15:
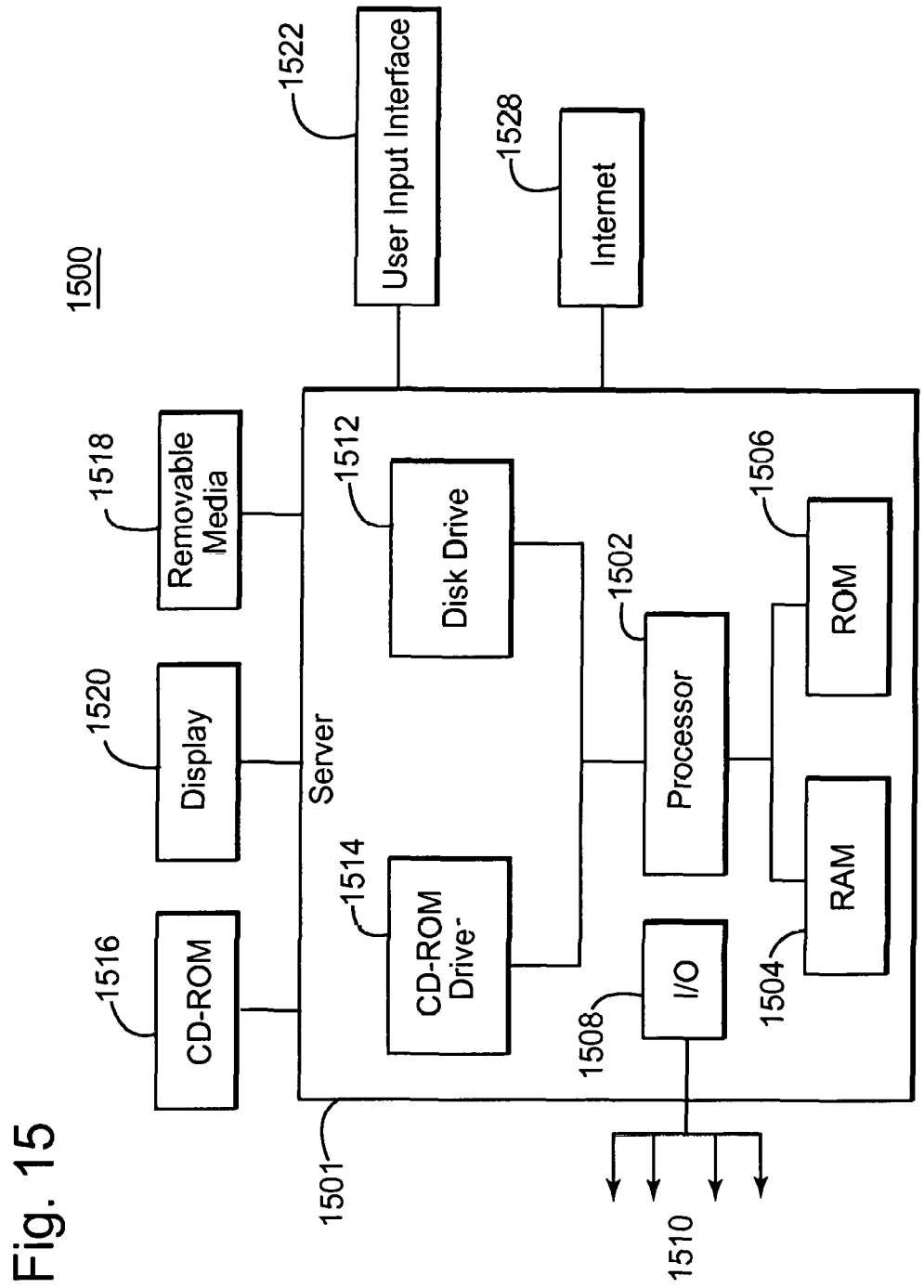
FIG. 15 illustrates a computing device in which one or more of the embodiments discussed herein may be implemented.

An example of a representative processing device capable of carrying out operations in accordance with the embodiments discussed above is illustrated in FIG. 15. Hardware, firmware, software or a combination thereof may be used to perform the various steps and operations described herein. The processing device 1500 of FIG. 15 is an exemplary computing structure that may implement any of the processes and methods discussed above or combinations of them. Processing device 1500 may also serve as any of the controllers discussed above with regard to FIGS. 5, 6, 10 and 12.

The exemplary processing device 1500 suitable for performing the activities described in the exemplary embodiments may include server 1501. Such a server 1501 may include a central processor unit (CPU) 1502 coupled to a random access memory (RAM) 1504 and/or to a read-only memory (ROM) 1506. ROM 1506 may also be other types of storage media to store programs, such as programmable ROM (PROM), erasable PROM (EPROM), etc. Processor 1502 may communicate with other internal and external components through input/output (I/O) circuitry 1508 and bussing 1510, to provide control signals and the like. For example, processor 1502 may communicate with the actuator system and/or the brake mechanism of each source. Processor 1502 carries out a variety of functions as are known in the art, as dictated by software and/or firmware instructions.

Server 1501 may also include one or more data storage devices, including disk drives 1512, CD-ROM drives 1514, and other hardware capable of reading and/or storing information, such as a DVD, etc. In one embodiment, software for carrying out the above-discussed steps may be stored and distributed on a CD-ROM 1516, removable media 1518 or other form of media capable of storing information. The storage media may be inserted into, and read by, devices such as the CD-ROM drive 1514, disk drive 1512, etc. Server 1501 may be coupled to a display 1520, which may be any type of known display or presentation screen, such as LCD, plasma displays, cathode ray tubes (CRT), etc. A user input interface 1522 is provided, including one or more user interface mechanisms such as a mouse, keyboard, microphone, touch pad, touch screen, voice-recognition system, etc.

Server 1501 may be coupled to other computing devices, such as a general controller, via a network. The server may be part of a larger network configuration as in a global area network (GAN) such as the Internet 1528, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

Figure 16:
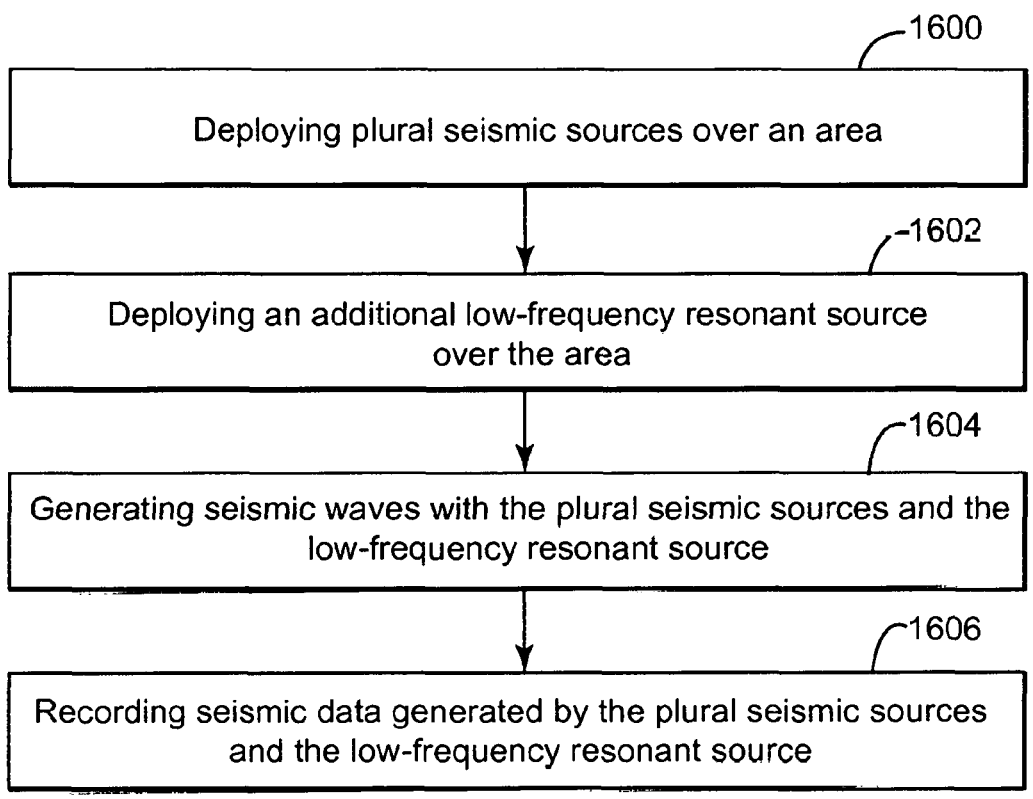
FIG. 16 is a flowchart of a method for performing a seismic survey with at least one low-frequency resonant source.

According to an embodiment illustrated in FIG. 16, there is a method for collecting seismic data during a land seismic survey, wherein the method uses one of the low-frequency resonant sources discussed above. The method includes a step 1600 of deploying plural seismic sources over an area, a step 1602 of deploying an additional low-frequency resonant source over the area, a step 1604 of generating seismic waves with the plural seismic sources and the low-frequency resonant source, and a step 1606 of recording seismic data generated by the plural seismic sources and the low-frequency resonant source. The low-frequency resonant source generates one or more frequencies less than about 5 Hz by oscillating a reaction mass with a resonant suspension system that includes a spring (619) and a clamp spring system (630) or a pneumatic spring system (1007).

The disclosed exemplary embodiments provide a resonant source capable of emitting energy in the low-frequency range, e.g. 0.1 to 5 Hz. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A resonant source for generating low-frequency seismic waves, the resonant source comprising:
   a frame;
   a reaction mass configured to oscillate relative to the frame;
   a resonant suspension system connecting the reaction mass to the frame and including at least a coil spring; and
   a spring clamp system connected to the at least coil spring, between ends of the at least coil spring of the resonant suspension system and configured to modify a resonant frequency of the resonant suspension system,
   wherein the resonant suspension system is configured to allow the reaction mass to oscillate relative to the frame with a corresponding resonant frequency.

2. The resonant source of claim 1, wherein the resonant frequency is between 0.1 and 5 Hz.

3. The resonant source of claim 1, further comprising:
   a nozzle supplied with compressed air and configured to release the compressed air on the reaction mass for making it oscillate with the corresponding resonant frequency.

4. The resonant source of claim 1, further comprising:
   an actuator connected to the resonant suspension system and configured to drive the reaction mass with the corresponding resonant frequency.

5. The resonant source of claim 4, wherein the spring clamp system comprises:
   a clamp configured to attach to the spring and to define an upper part and a lower part of the spring, wherein the lower part determines a respective resonant frequency.

6. The resonant source of claim 5, wherein the clamp is connected to a motor that controls a position of the clamp relative to the spring so that the respective resonant frequency is changed to another resonant frequency.

7. The resonant source of claim 6, wherein the clamp includes a chuck configured to receive the spring and one or more jaws configured to fix a portion of the spring relative to the frame.

8. The resonant source of claim 1, wherein the spring includes plural individual springs connected to each other in series, each individual spring having a different spring rate than the others.

9. A resonant source for generating low-frequency seismic waves, the resonant source comprising:
   a frame;
   a reaction mass configured to oscillate relative to the frame;
   a resonant suspension system connecting the reaction mass to the frame and including at least a pneumatic spring system connected with a first end to the reaction mass and with a second end to the frame; and
   a pneumatic valve fluidly connected to the pneumatic spring system and configured to supply compressed air for maintaining an oscillation of the reaction mass with a corresponding resonant frequency,
   wherein the resonant suspension system is configured to allow the reaction mass to oscillate relative to the frame with the corresponding resonant frequency.

10. The resonant source of claim 9, wherein the resonant frequency is between 0.1 and 5 Hz.

11. The resonant source of claim 9, wherein the resonant suspension system further comprises:
    a spring connected in parallel with the pneumatic spring system between the frame and the reaction mass.

12. The resonant source of claim 11, further comprising:
    an actuator connected to the spring and configured to maintain an oscillation of the spring.

13. The resonant source of claim 12, wherein the pneumatic spring system comprises:
    a cylinder that includes a piston connected with a piston rod to the actuator or to the reaction mass,
    wherein the cylinder is sealed.

14. The resonant source of claim 13, wherein the cylinder has a non-constant, interior cross-section along a longitudinal axis.

15. The resonant source of claim 14, further comprising:
    a spring clamp system configured to change a spring rate of the spring.

16. The resonant source of claim 15, further comprising:
    a controller configured to store a set of discrete resonant frequencies to be achieved by the reaction mass and connected to the actuator, the spring clamp system, and the valve, and also configured to apply one of the discrete resonant frequencies to the resonant suspension system.

17. A method for collecting seismic data during a seismic survey, the method comprising:
    deploying plural seismic sources over an area;
    deploying an additional low-frequency resonant source over the area;
    generating seismic waves with the plural seismic sources and the low-frequency resonant source; and
    recording seismic data generated by the plural seismic sources and the low-frequency resonant source,
    wherein the low-frequency resonant source generates one or more frequencies less than 5 Hz by oscillating a reaction mass with a resonant suspension system that includes (i) a coil spring connected between the reaction mass and a frame, and a clamp spring system attached to the coil spring, between ends of the coil spring or (ii) a pneumatic spring system connected with a first end to the reaction mass and with a second end to the frame.

18. The method of claim 17, further comprising:
    oscillating the reaction mass at or near its resonant frequency.

19. The method of claim 18, further comprising:
    adjusting the resonant frequency.

20. The method of claim 18, wherein the reaction mass oscillates substantially only with the resonant frequency.

* * * * *